United States Patent

Ryu et al.

[11] Patent Number: 5,819,845
[45] Date of Patent: Oct. 13, 1998

[54] TEMPERATURE CONTROL METHOD FOR A HEATING/COOLING SYSTEM

[75] Inventors: Byung-Joo Ryu, Kunpo; Yun-Bong Chun, Seoul, both of Rep. of Korea

[73] Assignee: SamSung Electronics Co., Ltd., Suwon, Rep. of Korea

[21] Appl. No.: 561,192

[22] Filed: Nov. 21, 1995

Related U.S. Application Data

[63] Continuation-in-part of Ser. No. 793,462, Nov. 18, 1991, abandoned.

[30] Foreign Application Priority Data

Nov. 24, 1990 [KR] Rep. of Korea ................. 19140/1990

[51] Int. Cl.$^6$ ...................................................... F25B 29/00
[52] U.S. Cl. ...................... 165/254; 165/259; 236/78 D; 236/11; 364/162
[58] Field of Search ...................... 165/254, 259, 165/42, 43; 236/78 D, 11; 364/192

[56] References Cited

U.S. PATENT DOCUMENTS

| | | | |
|---|---|---|---|
| 3,826,305 | 7/1974 | Fishman | 165/259 |
| 4,466,480 | 8/1984 | Ito et al. | 165/43 |
| 4,485,863 | 12/1984 | Yoshida et al. | 165/42 |
| 4,487,254 | 12/1984 | Hayashibara | 165/42 |
| 4,498,309 | 2/1985 | Kobayashi et al. | 165/43 |
| 4,697,430 | 10/1987 | Toyoda et al. | 236/91 C |
| 4,744,511 | 5/1988 | Kakehi et al. | 165/42 |
| 4,991,770 | 2/1991 | Bird et al. | 236/78 D |

FOREIGN PATENT DOCUMENTS

| | | | |
|---|---|---|---|
| 0425454 | 5/1991 | European Pat. Off. | 236/78 D |
| 0068548 | 5/1980 | Japan | 236/11 |

OTHER PUBLICATIONS

Operator Convenience is Key as Process Controllers Evolve Henry A. Morris, Control Engineering, Mar. 1981.
Writing P–I–D. Control Loops Easily in Basic, Control Engineering, James Fishbeck, vol. 25 No. 10 Oct. 1978.

*Primary Examiner*—John K. Ford
*Attorney, Agent, or Firm*—Robert E. Bushnell, Esq.

[57] ABSTRACT

A temperature control method and apparatus therefor controls an air temperature in a room by determining an error temperature between a set temperature and an actual room temperature. An auxiliary reference calorie is initially set as a previous state calorie value, an error calorie associated with the detected error temperature is determined by PID operation and a current calorie value in determined by adding or subtracting the previous state calorie value to/from error calorie, and the room temperature is brought to the set temperature using the current calorie value.

9 Claims, 5 Drawing Sheets

FIG. 1

FIG. 2A — HIGH SPEED TEMPERATURE CHANGE

FIG. 2B — MIDDLE SPEED TEMPERATURE CHANGE

FIG. 2C — LOW SPEED TEMPERATURE CHANGE

TEMPERATURE CONTROL METHOD FOR A HEATING/COOLING SYSTEM

CROSS REFERENCE TO RELATED APPLICATIONS

This is a continuation-in-part of U.S. patent application Ser. No. 07/793,462 and claims all benefits accruing under 35 U.S.C §120. This application makes reference to, incorporates the same herein, and claims all benefits accruing under 35 U.S.C §119 from an application entitled *Temperature Control Method For Air Conditioner* earlier filed in the Korean Industrial Property Office on 24 Nov. 1990, which was duly assigned Ser. No. 90-19140 by that Office.

FIELD OF THE INVENTION

This invention relates to a temperature control method for use with a heating/cooling system, and more particularly to a temperature method for causing room temperature to reach a target temperature, i.e., a set temperature, the heating/cooling system having a "HIGH", "MIDDLE" and "LOW" speed conditions of operation. The heating/cooling system referred to herein is an apparatus for warming or cooling the room, as desired.

BACKGROUND OF THE INVENTION

In order to control room temperature in two steps using a conventional system, the system is operated in a high speed mode at a lower room temperature relative to an auxiliary, i.e., target or set, temperature compared to the room temperature, and otherwise the system is operated in a low speed mode at a higher room temperature relative to the auxiliary temperature compared to the room temperature.

It is noted that such a system control method includes: two stages of the high and low operation modes by reference to the set or auxiliary temperature. Instead of facilitating the room temperature control of the system, it is difficult to control room temperature to be maintained at the set temperature. Thus, the room cannot be kept at a stable temperature, and fuel consumption is excessive.

In order to solve these problems, a typical prior art is disclosed in U.S. Pat. No. 4,697,430 issued to Toyada et al. and entitled *Air Conditioner With A Radiant Temperature Control*, and incorporated herein by reference. The patent concerns an air conditioner (capable of heating and cooling) with radiant temperature TR control relative to a target temperature TS and a room temperature TA. A microprocessor determines the difference between the target temperature TS and the room temperature TR, and a memory stores the difference between TS and TA at which a most-comfortable air-conditioning state is obtained in the form of a predetermined value Tl, i.e., ΔTl. When the actual difference between TS and TA differs from ΔTl the target temperature is shifted up or down as corrected target temperature TS' and then until the difference reaches the value ΔTl, the radiant temperature TR is increased or deceased, by operation to the air conditioner, to obtain the corrected target temperature TS' while being fed back a number of predetermined times, thereby reducing the deviation between temperature TS and TA.

The patent includes a multi-phase control method for obtaining corresponding data from the previously stored load control data in accordance with the comparison difference of the value, ΔTl and the actual difference between temperatures TS and TA and then controlling the loads in many stages. It is impossible to control the air-conditioning, when the temperature difference occurs beyond the setting temperature control range, and also the control method is uniformly executed while lacking flexibility.

SUMMARY OF THE INVENTION

The invention has three auxiliary operation stages of a heating/cooling system with regard to a set temperature. The control system of this heating/cooling system computes the total caloric value corresponding to the difference between a set temperature and room temperature by reference to a caloric value of a predetermined sampling period, so that it controls the operation of the loads, for example a fan motor or an electronic pump, so that the room temperature will approach the set temperature.

An object of the present invention is to provide a temperature control method for a heating/cooling system in order to maintain the room temperature close to the set temperature.

Another object of the present invention is to provide a temperature control method for a heating/cooling system to determine a calorie corresponding to the difference between a set temperature and a room temperature based on a Proportional Integral Differential operation.

A further object of the present invention is to provide a method for a heating/cooling system for detecting a room temperature and a set temperature to obtain the difference therebetween, calculating a caloric value regarding the room temperature change during a predetermined delay time and controlling system loads through a Proportional Integral Differential operation (referred to as PID operation below) based on a relationship between a previous state caloric value and the caloric value of the detected temperature difference.

The invention utilizes a keyboard portion having a number of inputting keys in a key matrix for setting at least a predetermined temperature and time, a display portion for illustrating key input states, means for sensing room temperature, a microprocessor for receiving the signals indicative of the sensed room temperature and outputting control signals according to a program for controlling a fan motor portion, for controlling a blower motor portion, and for controlling an electronic pump portion and a burner portion connected to the microprocessor, motor blower portion and electric pump portion. The method comprises the steps of: determining if a signal associated with room temperature changing speed has been input, setting PID coefficients corresponding to the input signal associated with the room temperature changing speed, judging whether a sampling time for detecting error temperature, i.e. an error temperature detecting time, is changed or not, setting corresponding data to the sampling time or the changed sampling time of the error temperature detecting time, determining the elapse of the error temperature detecting time, a determining a difference in temperature, i.e. error temperature, between the set temperature and the actual room temperature at the time of the elapse of the error-temperature detecting time, calculating, by PID operation, a caloric value associated with the error temperature, i.e., an error caloric value, during the error temperature detecting time, storing the error caloric value and setting control parameters for system load in response thereto, determining a current caloric value by summing or subtracting a previous state caloric value to or from an error caloric value, and adjusting room temperature using a calculated caloric value.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

DETAILED DESCRIPTION OF THE INVENTION

Figure 1:
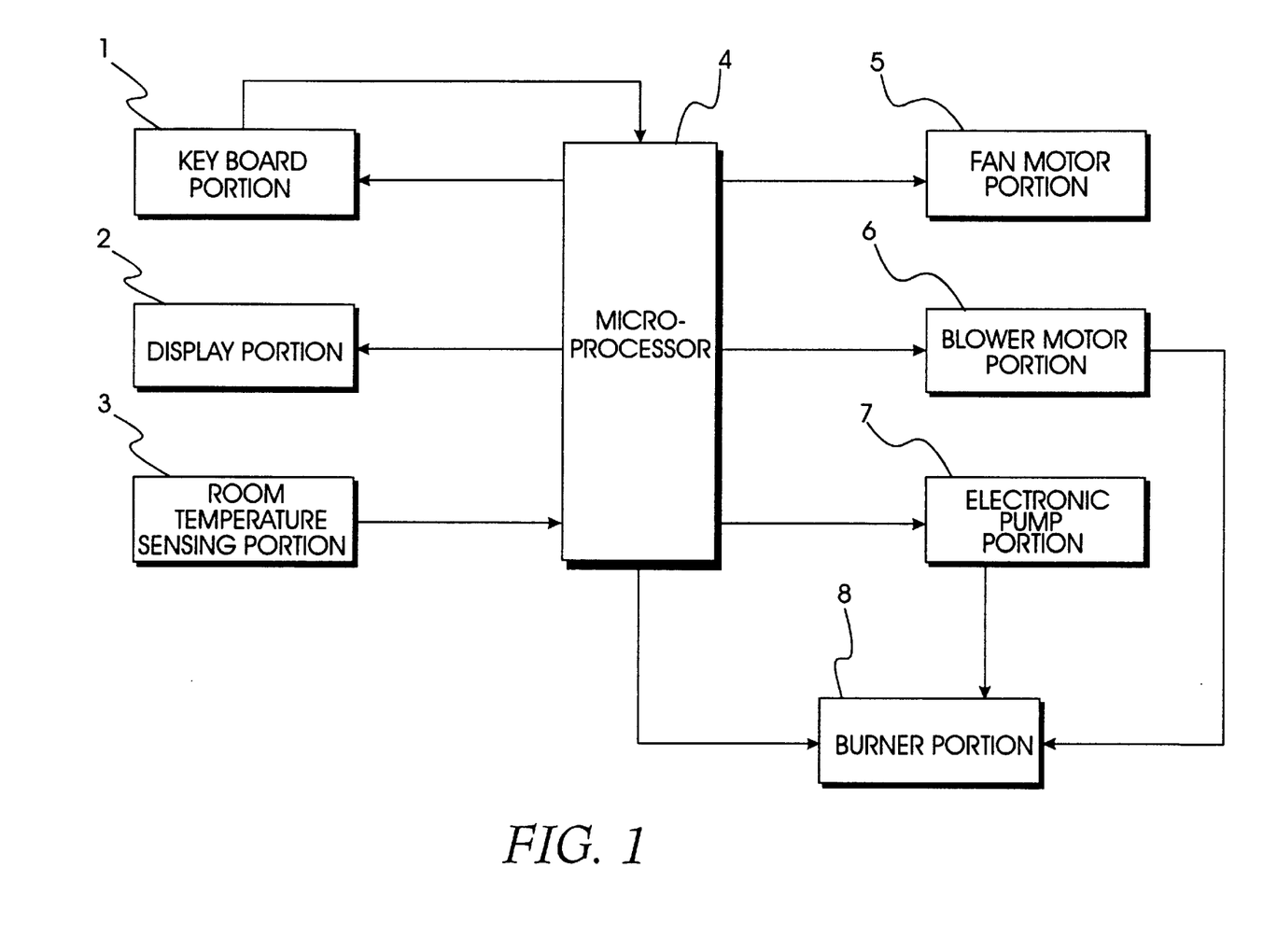
FIG. 1 is a block diagram showing a conventional heating/cooling system adapted to the method of the present invention.

FIG. 1 is a block diagram of a conventional heating/cooling system adapted to the present invention. A key matrix portion 1 includes a plurality of keys on a keyboard for inputting data signals, such as temperature, times, changing speeds and so on. A display portion 2 illustrates information corresponding to the key signal input from the key matrix portion 1. A room temperature sensing portion 3 detects room temperature using a temperature sensing element, such as a thermistor. A microprocessor 4 receives signals from the key matrix portion 2 and the room temperature sensing portion 3 and outputs control signals to control system loads. A fan motor portion 5 driven by control signals from the microprocessor 4 to force temperature controlled air into the room. A blower motor portion 6 is driven at a predetermined speed by control signals from the microprocessor 4 to force air into a carburetor (not shown). An electronic pump portion 7 is arranged to supply fuel to the carburetor based on control signals from the microprocessor 4. A burner portion 8 burns a mixture of fuel from the electronic pump portion 7 and air from the blower motor portion 6 based on control signals from the microprocessor 4.

The heating/cooling system of FIG. 1 changes the temperature of the air of the room to a temperature to be set on the key matrix portion 1. The microprocessor 4 operates the system loads according to a previous set temperature and enables display portion 2 to display control information. Thereafter, the room temperature sensing portion 3 detects the actual room temperature and feeds the detected actual room temperature data to the microprocessor 4. The microprocessor 4 compares the previous set temperature with the actual room temperature for analysis in order to control the system loads, such as the blower motor portion 6 and the electronic pump portion 7, etc., to supply fuel injection and air as well as to operate the burner portion 8, thereby changing the actual room temperature to the previous set temperature.

The microprocessor 4 controls system loads to cause the heating/cooling system to adjust the air temperature of the room to the set temperature based on a reference caloric value. After the elapse of a predetermined time period, the microprocessor 4 receives the actual temperature signal from the room temperature sensing portion 3 and compares it with the set temperature, and determines an error temperature considered as the difference therebetween. To determine the calories corresponding to the error temperature, the microprocessor 4 determines the calories during a predetermined time period, i.e., an error detecting time, or sampling time, based on an inner timer for detecting the error calories $\Delta U_K$. After the error detecting time, the error calories $\Delta U_K$ are represented as follows:

$$\Delta U_K = U_K - U_{K-1}$$

Wherein, the current calories $U_K$ are detected after the predetermined time K, and $U_{K-1}$ are the initial calories or the calories of a state just previous to the current state for $U_K$. The error calorie $\Delta U_K$ is determined based on the PID operation, wherein:

The output $U_K$ for a period of time K is as follows $$U_K = K_P E_K + K_I \left[ \frac{T(E_0 + E_1)}{2} + \frac{T(E_1 + E_2)}{2} + \frac{T(E_{K-1} + E_K)}{2} \right] + \frac{K_D}{T}(E_K - E_{K-1})$$

The output $U_{K-1}$ for a period of time K−1 is as follows:

$$U_{K-1} = K_P E_{K-1} + K_I \left[ \frac{T(E_0 + E_1)}{2} + \frac{T(E_1 + E_2)}{2} + \frac{T(E_{K-2} + E_{K-1})}{2} \right] + \frac{K_D}{T}(E_{K-1} - E_{K-2})$$

Thus, $\Delta U_K = U_K - U_{K-1}$ $$= K_P(E_K - E_{K-1}) + \frac{K_I T}{2}(E_{K-1} + E_K) + \frac{K_D}{T}[(E_K - E_{K-1}) - (E_{K-1} - E_{K-2})] \quad (1)$$

Wherein, $E_K$ is an error temperature, $E_{K-1}$ is an error temperature in a previous state, time T is a difference between time K and time K−1, and $K_P$, $K_I$ and $K_D$ are gain coefficients of the proportional, integral and derived components of the PID operation, respectively. Temperatures are in degree Centigrade.

The formula (1) is changed as follows:

$$\Delta U_k = \alpha(E_K - E_{K-1}) + \beta(E_K + E_{K-1}) + \gamma[(E_K - E_{K-1}) - (E_{K-1}) - (E_{K-2})] \quad (2)$$

Wherein, $$\alpha = K_P, \beta = \frac{K_I T}{2}, \gamma = \frac{K_D}{T}$$

The formula is rewritten as follows:

$$\Delta U_K = \alpha(E_K - E_{K-1}) + \frac{\beta}{\alpha}(E_K + E_{K-1}) + \frac{\gamma}{\beta}[(E_K - E_{K-1}) - (E_{K-1} - E_{K-2})] \quad (3)$$

$$= \alpha(P) + \frac{\beta}{\alpha}(I) + \frac{\gamma}{\beta}(D)$$

In connection with formula (3), a burner motor was used as an example in order to determine the values of $$\alpha, \frac{\beta}{\alpha}, \frac{\gamma}{\beta}.$$

And the coefficients of PID functions $$\alpha(P), \frac{\beta}{\alpha}(I), \frac{\gamma}{\beta}(D)$$

were each determined through numerous experiments. For example, when the coefficients were selected to be ½, ⅛ and 1, respectively, the rotation number of the burner motor returns to the normal state fast. At that time, the combustion state becomes stable. Herein, the rotation number of the burner motor represents the heating state of HIGH, MIDDLE, LOW at the optimum speed, called reference rotation speed, which were determined through the operation experiments. If an error temperature detecting time is considered as time T, and the time taken for the six rotations of the burner motor is 0.68 ms, the heating states of HIGH, MIDDLE, LOW representing in each of the error temperature detecting time T are related with the reference rotation speed as the following table:

TABLE

| Heating state | Reference rotation speed | Error temperature detecting time T | Count of reference rotation speed (HEX) |
|---|---|---|---|
| HIGH | 2628 | 137 ms | C9 |
| MIDDLE | 2143 | 168 ms | F7 |
| LOW | 1644 | 219 ms | 142 |

Herein, it is noted that the PID coefficients and the reference rotation speeds for controlling each of the systems load are stored as operational data and a Hex table value in the microprocessor, together. Also, the reference rotation speed of the burner motor during the error temperature detecting time T is calculated as follows;

The reference rotation speed=(1000(ms)÷(T/6))×60=360,000/T

Figure 4:
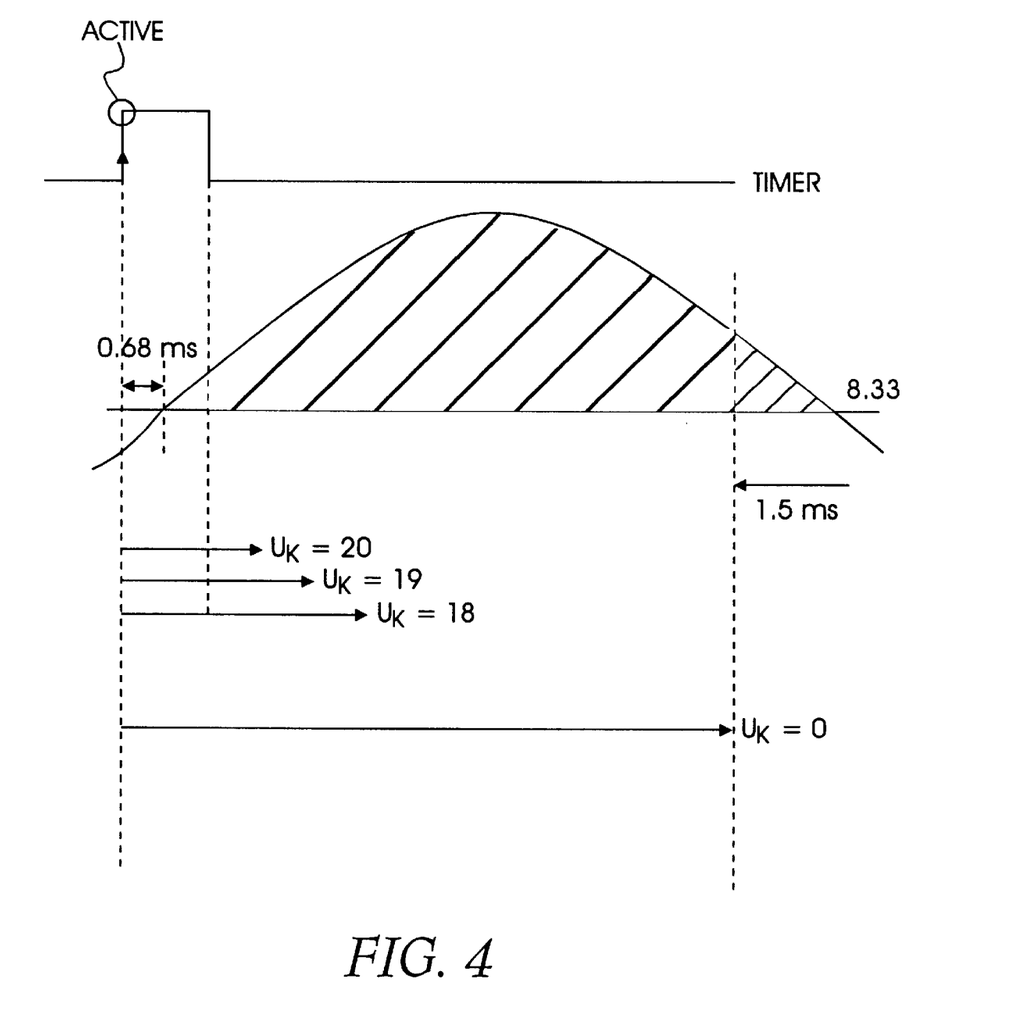
FIG. 4 is a graph illustrating the operation of a burner motor adapted to the present invention.

On the other hand, referring to FIG. 4 for the purpose of the more detailed explanation, as the inner timer of the microprocessor is operated, the commercial AC power having the frequency of 60 Hz is applied to the burner motor, in which the AC power is converted into the rectified current to have the frequency of 120 Hz by means of a half bridge type rectifying element mounted outside the microprocessor, and its cycle period is 8.33 ms. If the value that has calculated the output $U_K$ of the burner motor is 20 at the time of the HIGH speed mode and 0 at the time of the LOW speed mode, the phase delay time of the burner motor is 7.68 ms, and the delay time of the inner timer is 32 $\mu$s at the LOW speed mode. Thus, each of the inner timer counts of the HIGH speed mode and the LOW speed mode is 80(=2.56 ms/32 $\mu$s) and 240(=2.56 ms/32 $\mu$s).

Therefore, the output $U_K$ of the burner motor during time K is determined by the PID computing value of a microprocessor based on the operation modes of HIGH speed, MIDDLE speed and LOW speed. In other words, the microprocessor stores the counter values of an inner timer in the predetermined addresses of an inner memory in order to determine the output value $U_K$ of the burner motor. Also, the microprocessor is started by the inner timer and adjusts the power of AC (Alternative Current) applied to the burner motor. Thus, the inner timer determines the rotation speed of the system load and the phase of the power supply applied to the system load.

Herein, it is noted that the error calorie value $\Delta U_K$ is calculated by subtracting the previous caloric value $U_{K-1}$ from the current calorie value $U_K$. If $U_K$ is greater than $U_{K-1}$, it means that the burner motor is moving from the LOW speed mode to the HIGH speed mode. On the contrary, if $U_K$ is smaller than $U_{K-1}$, it means that the burner motor is moving from the HIGH speed mode to the LOW speed mode. Thus, the coefficients $K_P$, $K_I$ and $K_D$ followed with the PID operation have an effect on the rotation number of the burner motor and are selected as a value suitable for operating system loads. The selected coefficients are as the optimum factor for system loads. And the coefficients $K_P$, $K_I$, and $K_D$ are changeable by key matrix portion 1.

Figure 2A:
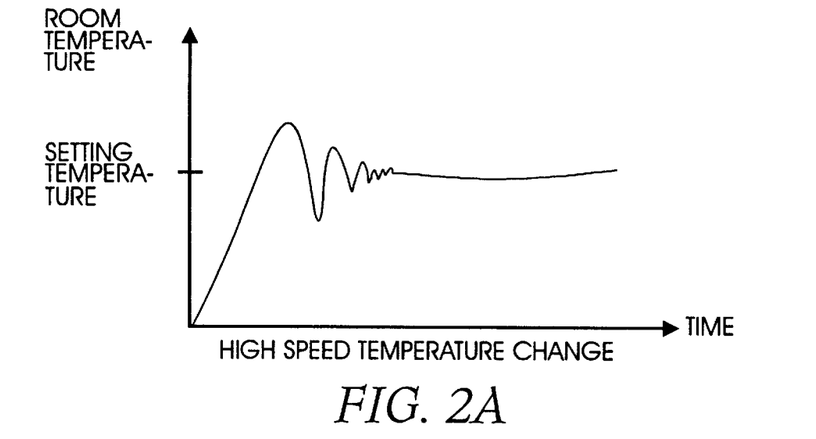
FIGS. 2A, 2B and 2C are graphs of room temperature changes based on the temperature control method of the present invention.
Figure 2B:
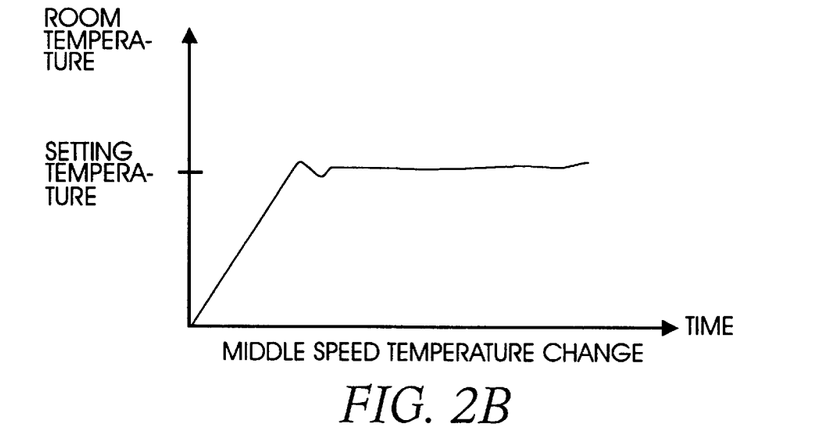
Figure 2C:
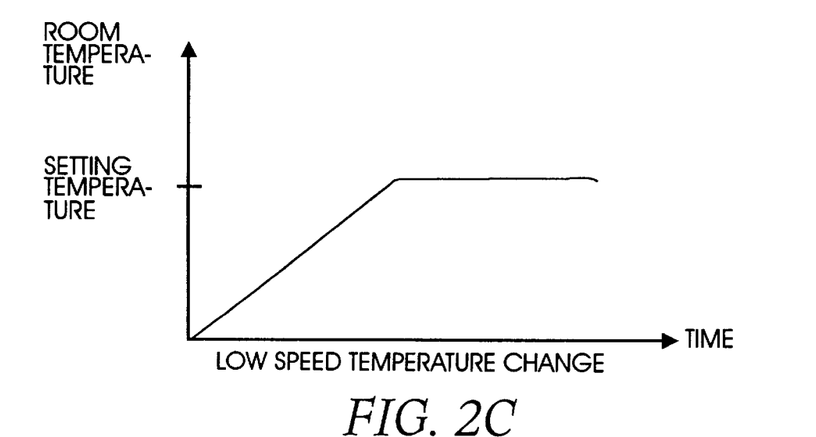

The control method accompanying the PID operation allows the user to select the operation mode using the keys of the key matrix portion 1. For example, if the room temperature changing time selected at a high speed operation mode by selection of the high speed key, room temperature will become equal to a set temperature (desired) in a shorter time with the room temperature changing waveform curve being steep over a temperature changing time ($\Delta t$) as shown in FIG. 2A. If the air conditioning operation selected at a middle speed operation mode by selection of the middle speed key, the resulting room temperature changing wavaform curve is less steep than that of the high speed operation mode, as shown in FIG. 2B, but the room temperature reaches a steady state set temperature at a faster speed. Also, if the air conditioning operation is selected at a low speed operation mode by selection of the low speed key, the resulting room temperature changing waveform curve of FIG. 2C is less steep than that of the middle speed operation mode, but the room temperature approaches a steady state set temperature at a faster speed. Next, according to another PID operation, the microprocessor drives the fan motor portion 5 to equalize the room temperature with the set temperature.

Figure 3A:
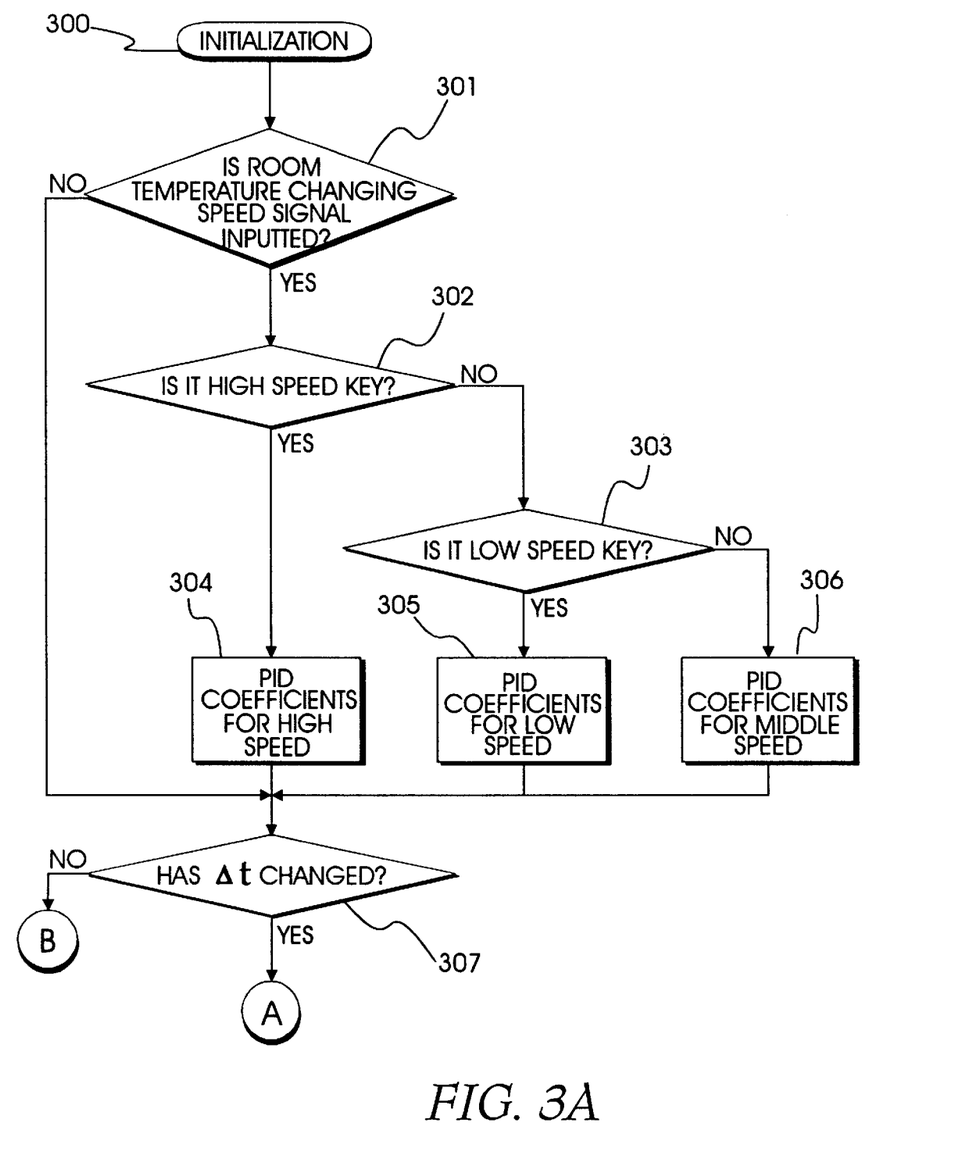
FIGS. 3A and 3B are flow charts showing the temperature control method according to the present invention.
Figure 3B:
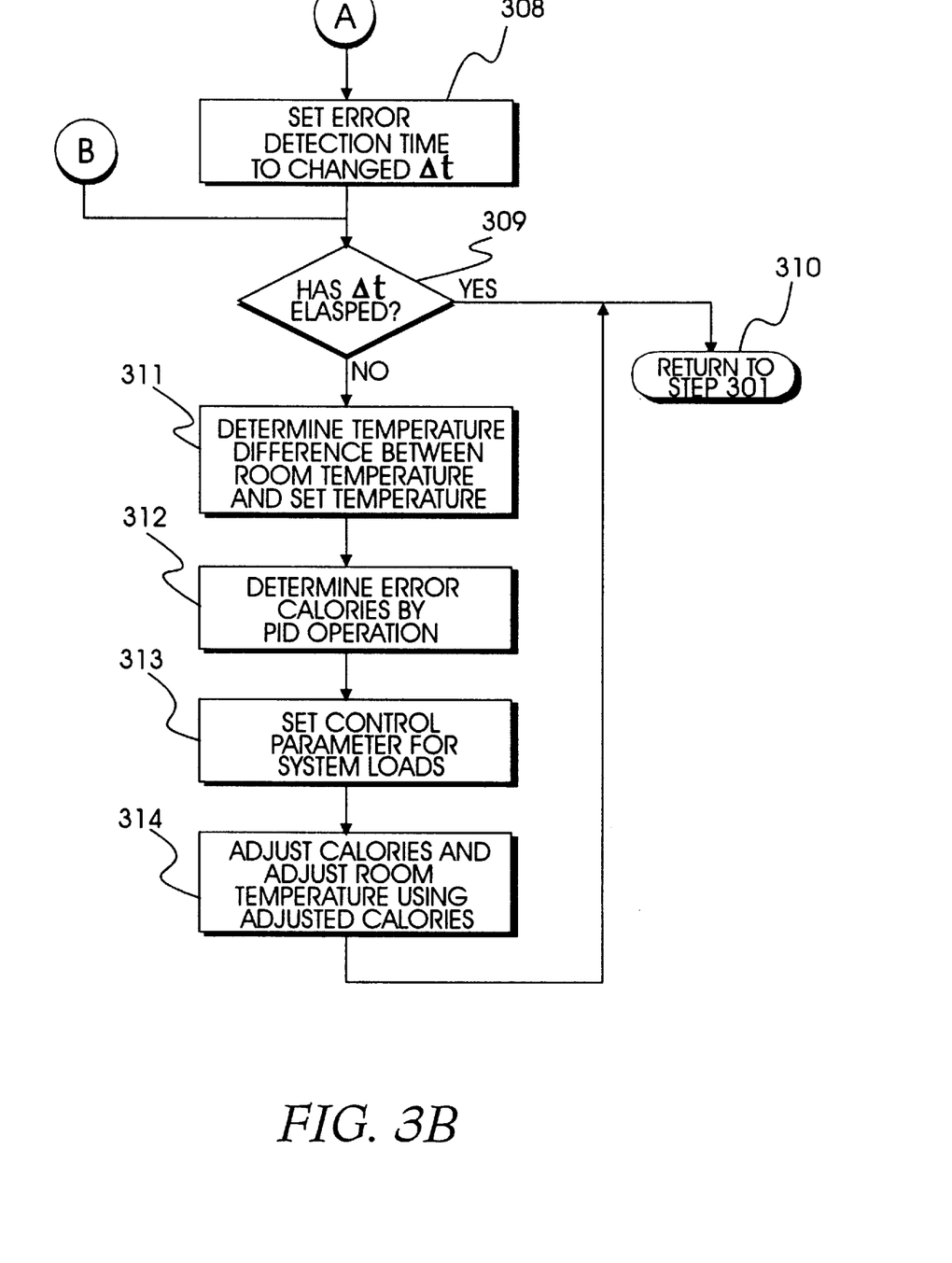

FIG. 3A and 3B are flow charts showing room temperature control procedures according to the present invention.

After being initialized in step 300, a microprocessor 4 determines at step 301 whether a key input signal associated with a room temperature changing speed is present. If no key input signal is input, step 301 is followed by step 307, but if a key input signal is present, step 301 is followed by step 302. Steps 302 and 303 determine whether the key signal is the high speed key or low speed key that has been selected. If it is the high speed key, the PID coefficients $K_P$, $K_I$ and $K_D$ stored previously in the microprocessor 4 for controlling the system load in the high speed operation mode are setin step 304, if it is the low speed key, then the PID coefficients associated with the low speed operation mode are set in step 306, and if it is neither the high speed key or the low speed key, then the PID coefficients for the middle speed operation mode are set in step 305. The microprocessor 4 controls the heating/cooling system based on the PID operation of the HIGH, LOW or MIDDLE operation speed modes. Therefore, the microprocessor 4 operates a plurality of system loads for a predetermined period for heating or cooling.

Next, in step 307 it is, determined whether an error temperature detecting time ($\Delta t$) is changed. If changed, the error temperature detecting time is set to the changed error temperature detecting time. In step 309, it is determined whether the error temperature detecting time, also called a sampling time, ($\Delta t$) has elapsed. If not, step 310 causes the processing to return to step 301.

If the error temperature detecting time has elapsed, the microprocessor 4 determines the error temperature by detecting the temperature difference between a set temperature and an actual (current) room temperature in step 311. Then, the error calories $\Delta U_K$ associated with the error temperature are determined by the PID operation during the sampling time($\Delta t$). The error calories $\Delta U_K$ are stored in the microprocessor 4 to set control parameters for system load at step 313. Then, at step 314 the current calories $U_K$ are determined by adding or subtracting the previous state calories $U_{K-1}$ to or from the error calories $\Delta U_K$. Adjusting the actual room temperature using the current calories $U_K$ is to approach the set temperature.

As described above, if a key signal for heating/cooling is input into the microprocessor 4 from the key matrix portion 1 as shown in FIG. 1, the microprocessor 4 performs step 301 for judging whether the input signal associated with the room temperature changing speed data is present. Then, the microprocessor 4 jumps to step 307 for determining whether an error temperature detecting time ($\Delta t$) is changed, if not present. If present, it executes step 301 for setting a predetermined air-conditioning operation, in which it judges whether the room temperature changing speed signal is any one of a high speed key, a middle speed key and a low speed key, sets PID coefficients $K_P$, $K_I$ and $K_D$ for controlling system loads at the corresponding speed and then judges at step 307 whether an error temperature detecting time ($\Delta t$) has changed.

The microprocessor 4 jumps to step 309 for determining whether the error temperature detecting time has elapsed, if not changed. It carries out step 308 for changing the error temperature detecting time, if $\Delta t$ has changed and then goes on step 309 to judge whether the error temperature detecting time, called a sampling time ($\Delta t$), has elapsed. At that time, if not elapsed, it returns to an earlier step.

The microprocessor 4 detects a temperature difference between a set temperature and room temperature at step 311, if the error temperature detecting time has elapsed. Then, it moves to step 312 to compute error calories $\Delta U_K$, considered as error calories by PID operation during the sampling time ($\Delta t$) associated with the error temperature.

The microprocessor 4 sets a control parameter for a system load as the calculated calories $U_K$ at step 313. Then, it goes onto step 314 to add/subtract the error calories $\Delta U_K$ to/from the previous state calorie $U_{K-1}$, so that the current calories $U_K$ determined for approaching the actual room temperature to the set temperature.

Thus, the invention controls the heating or cooling operation in a manner that an error temperature between a set temperature and the actual room temperature is first determined in response to an auxiliary reference calorie being set as the initial previous state calorie value, an error calorie associated with the detected error temperature in determined by PID operation, the error calories are added or subtracted to/from the previous state calories, and the room temperature is reached near the set temperature using the computed resulting current calorie value. The method according to the invention can effect an efficient temperature changing method for optimum heating/cooling performance having reliability as well as reduced fuel consumption.

What is claimed is:

1. A method of controlling a heating/cooling system, comprising the steps of:
   determining whether a key signal indicative of a room temperature changing speed is input to a controller from a keyboard, said key signal corresponding to a desired speed for changing a room temperature;
   setting proportional integral differential coefficients corresponding to said key signal, when said determining step determines said key signal has been input, for enabling system loads to be operated for a predetermined time period;
   determining an error temperature detecting time;
   detecting a difference between a set temperature and a current room temperature when the error temperature detecting time has elapsed;
   determining error calories corresponding to said difference in accordance with a proportional integral differential operation utilizing said proportional integral differential coefficients;
   storing said error calories and adding/subtracting said error calories to/from a previous calorie to determine a current calorie; and,
   controlling system loads to adjust said room temperature to said set temperature in accordance with said current calorie.

2. The method of controlling a heating/cooling system as claimed in claim 1, further comprising:
   setting control parameters for system loads after storing said error calories.

3. A method of controlling a heating/cooling system, comprising the steps of:
   providing at a first time a set temperature of an area to be temperature regulated;
   detecting a current temperature of said area at a second time;
   determining an error calorie value in dependence upon a proportional integral differential operation, said error caloric value corresponding to an amount of energy required to change the current temperature of the area to the set temperature; and
   initiating one of operations for warming and cooling said area in accordance with the error calorie value.

4. The method of claim 3, further comprising the steps of:
   determining whether a key signal indicative of a room temperature changing speed is input to a controller from a keyboard, said key signal corresponding to a desired speed for changing a room temperature;
   providing, when it is determined that said key signal has been input, predetermined system load control coefficients, corresponding to proportional integral differential coefficients, for operating system loads dependent upon a room temperature changing speed;
   determining an error temperature as a difference between said current temperature and said set temperature when an error detecting time has elapsed, wherein said error caloric value corresponds to said error temperature.

5. The method of claim 4, wherein the step of providing predetermined system load control coefficient comprises:
   setting low speed load control coefficients corresponding to operating system loads for compensating for the error caloric value when said room temperature changing speed is a low speed;
   setting medium speed load control coefficients corresponding to operating system loads for compensating for the error calorie value when said room temperature changing speed is a medium speed;
   setting high speed load control coefficients corresponding to operating system loads for compensating for the error calorie value when said room temperature changing speed is a high speed.

6. A method of controlling a heating/cooling system comprising a microprocessor for controlling the system, means for user interface with the microprocessor, a display of information processed in the microprocessor during operation of the system, sensor means for sensing temperature of an area to be temperature regulated, and means for heating/cooling said area, the method comprising the steps of:

provided at a first time a set temperature of an area to be temperature regulated;

detecting a current temperature of said area at a second time;

determining a temperature difference by comparing the set temperature and the current temperature;

determining an error calorie value in dependence upon a proportional integral differential operation utilizing said temperature difference, said error calorie value corresponding to an amount of energy required to change the current temperature of the area to the set temperature; and providing a selected operation of one of warming and cooling said area in accordance with the error caloric value.

7. The method of claim 6, further comprising the steps of:

determining whether a key signal indicative of a room temperature changing speed is input to a controller from a keyboard, said key signal corresponding to a desired speed for changing a room temperature, providing, when it is determined that said key signal has been input, predetermined system load control coefficients, corresponding to proportional integral differential coefficients, for operating system loads dependent upon a room temperature changing speed; and determining the temperature difference when an error detecting time has elapsed.

8. The method of claim 7, said step of providing predetermined system load coefficients comprising the steps of:

setting low speed load control coefficients corresponding to operating system loads when compensating for the error calorie value at a low speed;

setting medium speed load control coefficients corresponding to operating system loads when compensating for the error caloric value at a medium speed;

setting high speed load control coefficients corresponding to operating system loads when compensating for the error caloric value at a high speed.

9. A heating/cooling system comprising:

a proportional integral differential controller responding to differences between a current room temperature and a target temperature;

means for enabling user interaction with the controller;

sensor means for detecting said current room temperature;

means controlled by the controller, for circulating air in a room exhibiting said current room temperature;

a blower motor controlled by the controller and connected to a burner;

a pump controlled by the controller and connected to the burner; and wherein said controller:

determines whether a key signal for a desired room temperature changing speed is input via said means for enabling user interaction with the controller;

sets coefficients for a proportional integral differential operation, said coefficients corresponding to the desired room temperature changing speed, when said key signal is input, and enabling system loads to be operated for a predetermined time period;

sets an error detecting time;

detects a difference between the target temperature and the current room temperature when the error detecting time has elapsed;

determines error calories corresponding to said difference in accordance with the proportional integral differential operation;

stores said error calories and adds or subtracts said error calories to or from a previous calorie to determine a current calorie; and, controls system loads to adjust said room temperature to said target temperature in accordance with said current calorie.

* * * * *